(12) United States Patent
Suh et al.

(10) Patent No.: US 11,997,492 B2
(45) Date of Patent: May 28, 2024

(54) APPARATUS AND METHOD FOR INFORMATION SECURITY IN WIRELESS COMMUNICATION

(71) Applicant: Samsung Electronics Co., Ltd., Suwon-si (KR)

(72) Inventors: Kyungjoo Suh, Suwon-si (KR); Youngkyo Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 821 days.

(21) Appl. No.: 17/045,617

(22) PCT Filed: Apr. 5, 2019

(86) PCT No.: PCT/KR2019/004076
§ 371 (c)(1),
(2) Date: Oct. 6, 2020

(87) PCT Pub. No.: WO2019/194642
PCT Pub. Date: Oct. 10, 2019

(65) Prior Publication Data
US 2021/0168613 A1    Jun. 3, 2021

(30) Foreign Application Priority Data

Apr. 6, 2018 (KR) .................. 10-2018-0040281

(51) Int. Cl.
*H04W 12/106* (2021.01)
*H04W 8/08* (2009.01)
(Continued)

(52) U.S. Cl.
CPC ........... *H04W 12/106* (2021.01); *H04W 8/08* (2013.01); *H04W 8/24* (2013.01); *H04W 12/037* (2021.01); *H04W 60/04* (2013.01); *H04W 76/11* (2018.02)

(58) Field of Classification Search
CPC ....... H04W 12/106; H04W 8/08; H04W 8/24; H04W 12/037; H04W 60/04;
(Continued)

(56) References Cited

U.S. PATENT DOCUMENTS

| 8,638,936 B2 | 1/2014 | Suh et al. |
| 10,609,612 B1 | 3/2020 | Won et al. |

(Continued)

FOREIGN PATENT DOCUMENTS

| CN | 107580324 A | 1/2018 |
| CN | 107592974 A | 1/2018 |

(Continued)

OTHER PUBLICATIONS

U.S. Appl. No. 62/639,041, filed Mar. 6, 2018. (Year: 2018).*

(Continued)

*Primary Examiner* — Darren B Schwartz
(74) *Attorney, Agent, or Firm* — Jefferson IP Law, LLP

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). According to various embodiments of the present disclosure, an apparatus of a terminal in a wireless communication system may include a transceiver and at least one processor coupled to the transceiver, wherein the at least one processor may be configured to transmit a registration request message or a service request message including primary information and secondary information to an access and mobility management function (AMF), the primary information may be plain information, and the secondary information may be encrypted information.

9 Claims, 3 Drawing Sheets

(51) Int. Cl.
*H04W 8/24* (2009.01)
*H04W 12/00* (2021.01)
*H04W 12/02* (2009.01)
*H04W 12/03* (2021.01)
*H04W 12/037* (2021.01)
*H04W 60/00* (2009.01)
*H04W 60/04* (2009.01)
*H04W 76/11* (2018.01)

(58) Field of Classification Search
CPC ... H04W 76/11; H04W 12/009; H04W 12/03; H04W 60/00; H04W 12/02; H04W 12/08
See application file for complete search history.

(56) References Cited

U.S. PATENT DOCUMENTS

| | | | | |
|---|---|---|---|---|
| 2014/0179325 | A1* | 6/2014 | Xu | H04W 36/0033 455/437 |
| 2015/0082444 | A1* | 3/2015 | Rogers | H04W 12/08 726/26 |
| 2018/0092140 | A1 | 3/2018 | Dong et al. | |
| 2018/0160258 | A1* | 6/2018 | Hussain | H04W 4/029 |
| 2018/0324594 | A1* | 11/2018 | Chen | H04L 9/3242 |
| 2019/0059067 | A1* | 2/2019 | Lee | H04W 28/10 |
| 2019/0281649 | A1* | 9/2019 | Moisanen | H04W 80/10 |

FOREIGN PATENT DOCUMENTS

| | | |
|---|---|---|
| KR | 10-2015-0111687 A | 10/2015 |
| WO | 2010/019020 A2 | 2/2010 |

OTHER PUBLICATIONS

Ericsson et al., Addition of security mode control procedure, 3GPP TSG-CT WG1 Meeting #107, C1-175182, Reno (USA), Dec. 1, 2017.
3rd Generation Partnership Project; Technical Specification Group Core Network and Terminals; 6G System—Phase 1; CT WG1 Aspects (Release 15), 3GPP TR 24.890 V15.1.0, Mar. 29, 2018.
3rd Generation Partnership Project; Technical Specification Group Services and System Aspects; Security Architecture and Procedures for 5G System (Release 15), 3GPP TS 33.501 V0.4.0, Nov. 6, 2017.
European Search Report dated Mar. 4, 2021, issued in European Application No. 19780553.4.
Ericsson, 5G MM—primary authentication—transport of EAP messages, C1-174673, 3GPP TSG-CT WG1 Meeting #106, Oct. 27, 2017, Kochi (india).
European Office Action dated Feb. 9, 2023, issued in European Application No. 19 780 553.4.
3rd Generation Partnership Project; Technical Specification Group Services and System Aspects; Procedures for the 5G System; Stage 2 (Release 15), Sep. 2017.
3rd Generation Partnership Project; Technical Specification Group Services and System Aspects; Security architecture and procedures for 5G system (Release 15), Mar. 3, 2018.
Korean Office Action dated Nov. 23, 2021, issued in Korean Patent Application No. 10-2018-0040281.
3GPP TS 33.501; 3rd Generation Partnership Project; Technical Specification Group Services and System Aspects; Security architecture and procedures for 5G system; Mar. 2018.
3GPP TS 24.501;3rd Generation Partnership Project; Technical Specification Group Core Network and Terminals; Non-Access-Stratum (NAS) protocol; for 5G System (5GS); Stage ; Mar. 2018.
3GPP TSG RAN WG3 NR#99bis R3-181728; Sanya, China, Apr. 16-20, 2018.
3GPP TSG-RAN3 Meeting #99 R3-181328; Athens, Greece, Feb. 26-Mar. 2, 2018.
3GPP TSG-RAN WG3 #98 R3-174536; Reno, NV, USA, Nov. 27-Dec. 1, 2017.
Korean Office Action dated May 18, 2022, issued in Korean Patent Application No. 10-2018-0040281.
Ericsson; Addition of security mode control procedure (Redline); 3GPP TSG-CT WG1 Meeting #107; C1-175182; Nov. 27-Dec. 1, 2017; Reno (USA).
Chinese Office Action with English translation dated Sep. 4, 2023; Chinese Appln. No. 201980023651.3.
Chinese Notice of Allowance with English translation dated Mar. 15, 2024; Chinese Appln. No. 201980023651.3.

\* cited by examiner

[Fig. 1]
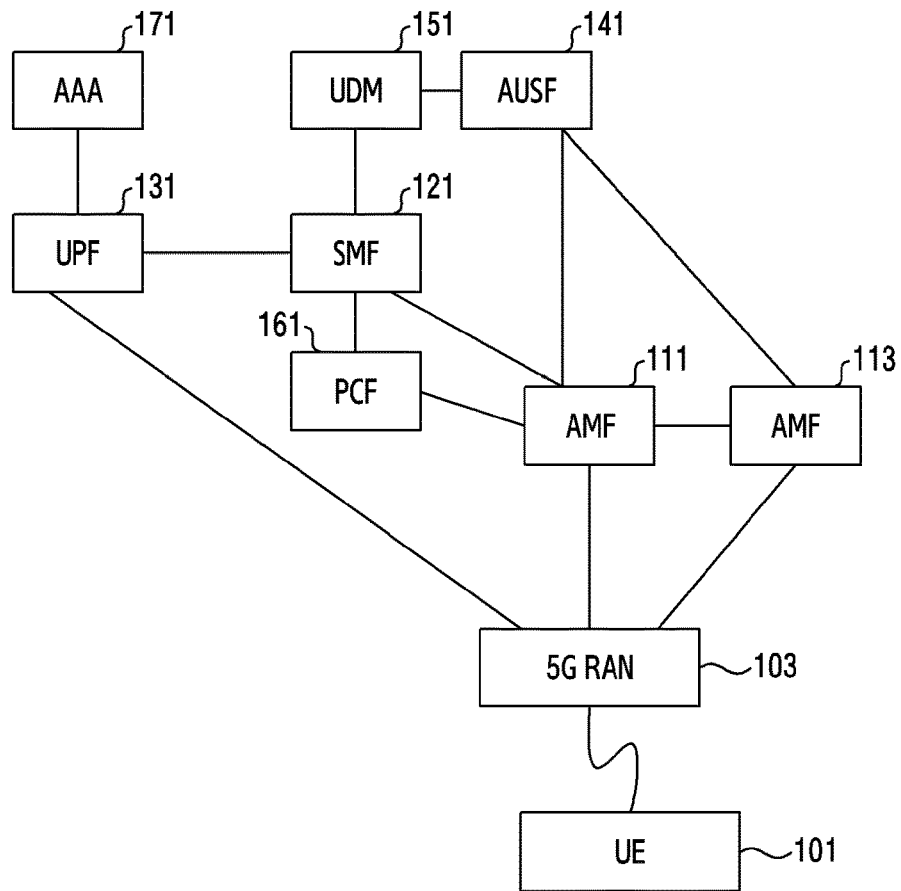
[Fig. 2]
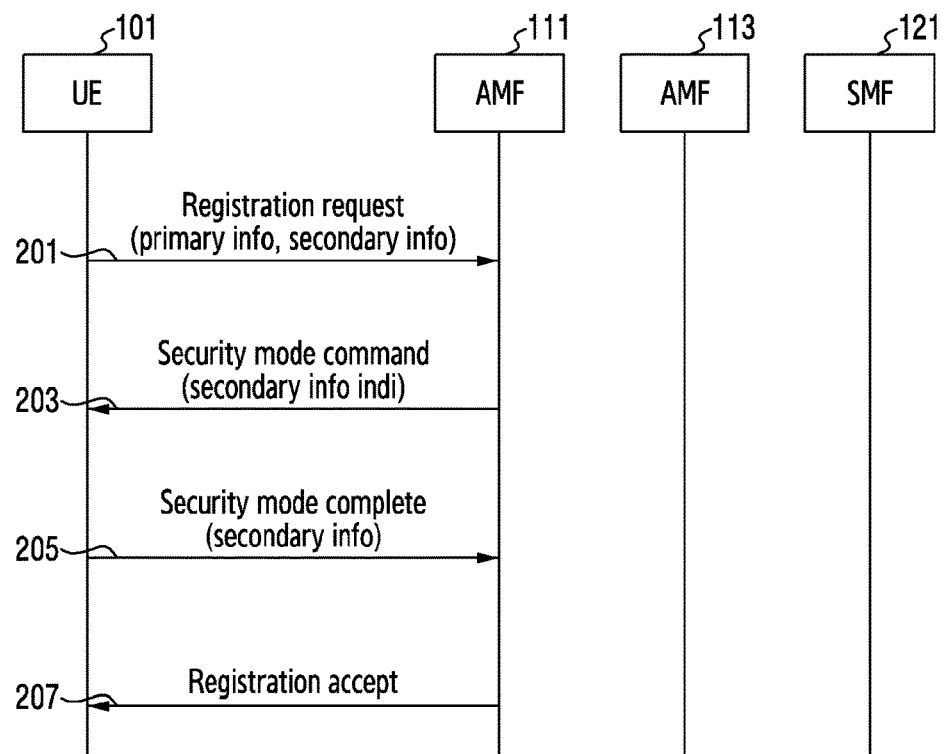

[Fig. 3]
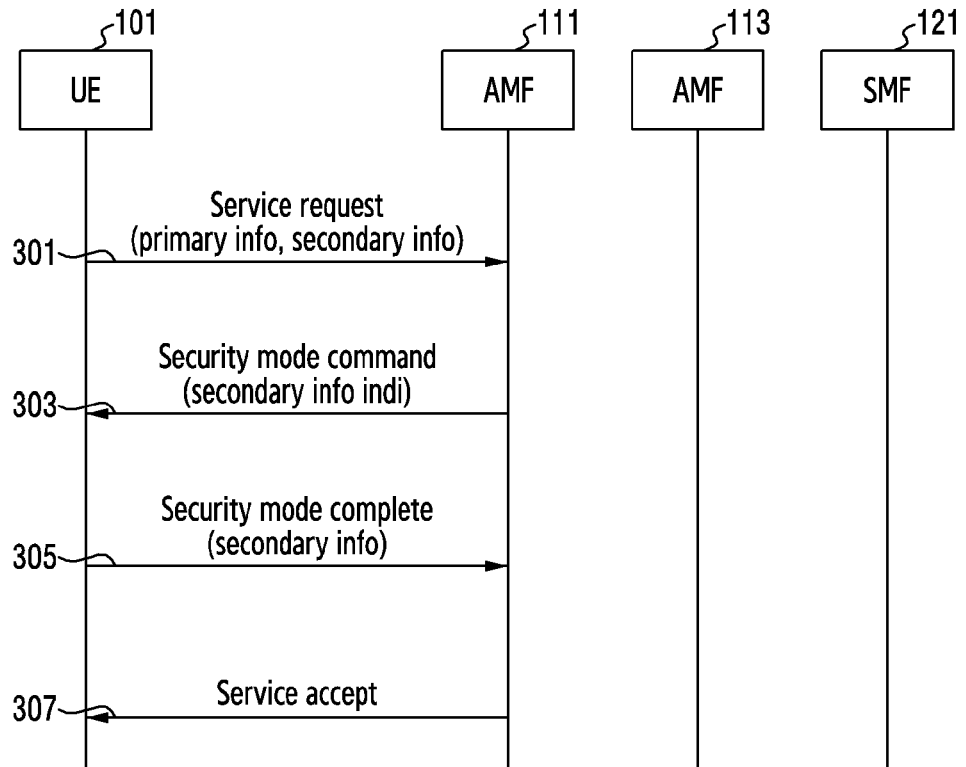
[Fig. 4]
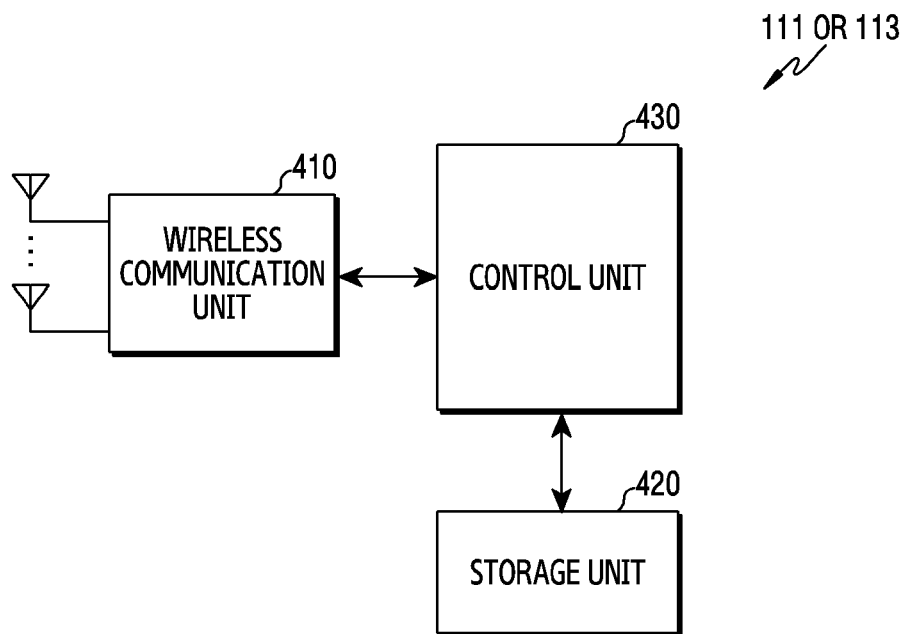

[Fig. 5]
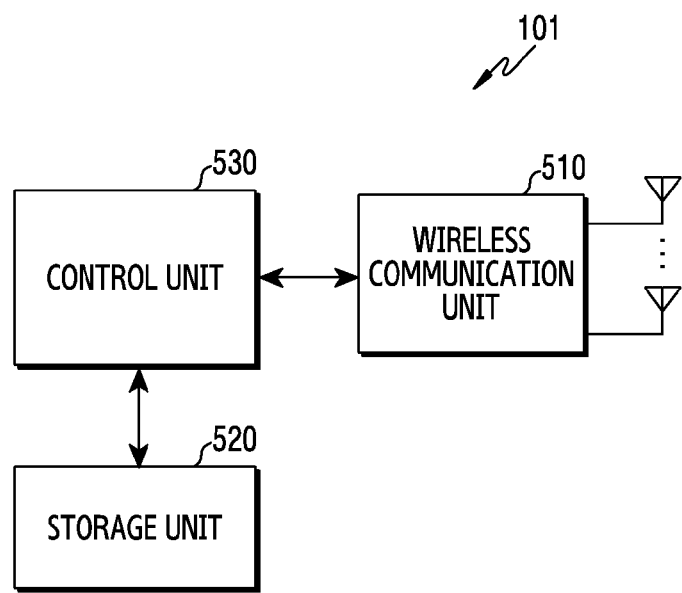

APPARATUS AND METHOD FOR INFORMATION SECURITY IN WIRELESS COMMUNICATION

TECHNICAL FIELD

The present disclosure relates generally to a wireless communication system, and more particularly, relates to an apparatus and a method for information security in the wireless communication system.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Various schemes for information security are under discussion in the 5G communication system.

DISCLOSURE OF INVENTION

Technical Problem

As discussed above, the present disclosure provides an apparatus and a method for information security of a terminal UE and a network in a wireless communication system.

Also, the present disclosure provides an apparatus and a method for information security as an entity for managing mobility and an entity for managing a session are separated in a wireless communication system.

Also, the present disclosure provides an apparatus and a method for communication by discovering an adequate corresponding node in communication between a terminal and a network, in a wireless communication system.

Also, the present disclosure provides an apparatus and a method for protecting information to be used in communication with an adequate corresponding node in communication between a TERMINAL and a network, in a wireless communication system.

Solution to Problem

According to various embodiments of the present disclosure, an apparatus of a terminal in a wireless communication system may include a transceiver and at least one processor coupled to the transceiver, wherein the at least one processor may be configured to transmit a registration request message or a service request message including primary information and secondary information to an access and mobility management function (AMF), the primary information may be plain information, and the secondary information may be encrypted information.

According to various embodiments of the present disclosure, an apparatus of an AMF in a wireless communication system may include a transceiver and at least one processor coupled to the transceiver, wherein the at least one processor may be configured to receive from a terminal a registration request message or a service request message including primary information and secondary information, the primary information may be plain information, and the secondary information may be encrypted information.

According to various embodiments of the present disclosure, an operating method of a terminal in a wireless communication system may include transmitting a registration request message or a service request message including primary information and secondary information to an AMF, wherein the primary information may be plain information and the secondary information may be encrypted information.

According to various embodiments of the present disclosure, an operating of an AMF in a wireless communication system may include receiving from a terminal a registration request message or a service request message including primary information and secondary information, wherein the primary information may be plain information and the secondary information may be encrypted information.

Advantageous Effects of Invention

An apparatus and a method according to various embodiments of the present disclosure may perform a security procedure when forwarding information between a terminal UE and a network entity to protect information transmitted to the terminal and the network in a 5G system, and thus fulfill the security procedure and efficient communication in the communication between the terminal and the network.

The achievable effects in the present disclosure are not limited to the above-stated effects, and other effects not mentioned herein may be clearly understood by those skilled in the art from descriptions below.

BRIEF DESCRIPTION OF DRAWINGS

FIG. 1 illustrates an example of a network environment for a security procedure in a wireless communication system according to various embodiments of the present disclosure.

FIG. 2 illustrates an example of signal exchange for supporting security in a wireless communication system according to various embodiments of the present disclosure.

FIG. 3 illustrates another example of signal exchange for supporting security in a wireless communication system according to various embodiments of the present disclosure.

FIG. 4 illustrates a configuration of a network entity in a wireless communication system according to various embodiments of the present disclosure.

FIG. 5 illustrates a configuration of a terminal in a wireless communication system according to various embodiments of the present disclosure.

BEST MODE FOR CARRYING OUT THE INVENTION

Hereafter, preferred embodiments of the present invention will be described in detail with reference to the accompanying drawings. At this time, it should be noted that the same reference numerals are used to designate the same elements throughout the drawings. In addition, well-known functions or constructions which would obscure the subject matter of the present invention shall be omitted.

The present specification explains embodiments by omitting techniques which are well known in the art to which the present invention belongs and is not directly related to the present invention. This is to clarify the subject matter of the present invention without obscuring it by eliminating unnecessary descriptions.

Some components in the attached drawings are exaggerated, omitted, or schematically shown for the same reason. In addition, the size of each element does not utterly reflect an actual size. Identical or corresponding components in each drawing have been given the same reference numbers.

Advantages and features of the present invention, and a method for accomplishing them will be clarified by referring to embodiments elucidated in conjunction with the accompanying drawings. However, the present invention is not limited to the embodiments set forth herein but may be embodied in many different forms, and the present embodiments are provided to complete the disclosure of the present invention and to indicate the full scope of the invention to those skilled in the art to which the present invention belongs. Like reference numerals indicate like elements throughout the specification.

Terms used in the present disclosure are used for describing particular embodiments and are not intended to limit the scope of other embodiments. A singular form may include a plurality of forms unless it is explicitly differently represented. All the terms used herein, including technical and scientific terms, may have the same meanings as terms that are generally understood by those skilled in the art to which the present disclosure pertains. Among terms used in the present disclosure, the terms defined in a general dictionary may be interpreted to have the same or similar meanings with the context of the relevant art, and, unless explicitly defined in this disclosure, it shall not be interpreted ideally or excessively as formal meanings. In some cases, even when terms are defined in this disclosure, the terms should not be interpreted to exclude the embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Terms for identifying access nodes, terms indicating network entities, terms indicating messages, terms indicating interfaces between network entities, terms indicating components of a device, and terms indicating various identification information, which are used in the following descriptions, are for the sake of explanations. Accordingly, the present disclosure is not limited to the terms to be described, and may use other terms having technically identical meaning.

Hereafter, for the sake of explanations, the present disclosure provides various embodiments using terms used in some communication standards (e.g., standards for 3rd Generation Partnership Project (3GPP), 5G, and LTE system), which is merely an example for explanations. However, the present invention is not limited by the terms and the names, and may be equally applied to a system which confirms to other standard. Various embodiments of the present disclosure may be easily modified and applied in other communication systems.

That is, while the various embodiments of the present disclosure mainly targets at a communication specification standardized by the 3GPP, salient features of the present disclosure may be applied to other communication systems having a similar technical background, with slight modifications, without departing from the scope of the present disclosure, which may be determined by a person having skilled technical knowledge in the art of the present invention. The standard documents like 3GPP technical specification (TS) 23.006, 33.501, and 24. 501 can be referred for understanding the embodiments disclosed in the application.

Hereafter, the present disclosure relates to an apparatus and a method for information security in a wireless communication system. Specifically, the present disclosure relates to information protection in data delivery between a terminal and a network of the wireless communication system (e.g., next 5G communication), a method for forwarding information of the terminal and the network, and an apparatus for fulfilling the same.

An entity for managing mobility and an entity for managing a session may be separated. For example, in 5G mobile communication, an access and mobility management function (AMF) which the entity for managing the mobility of the terminal and a session management function (SMF) for managing the session was separated. Hence, contrary to an operation scheme which is managed by MME in a conventional communication system (e.g., 4G LTE system), since the entities which manage the mobility and the session are divided, a communication scheme and a communication management scheme between the terminal and the network entities are changed. In addition, according to such separation, it is important to find and communicate with an adequate node in the communication between the terminal and the network, and a solution for protecting information to be used only in the communication with a corresponding node may be required.

The terminal or the network entity according to various embodiments of the present disclosure performs, in the communication, operations for selectively securing information. Procedures (e.g., integrity, ciphering) for securing the information are applied and executed selectively, rather than all together, to thus protect necessary information and reduce overhead caused in a specific procedure (e.g., ciphering).

Now, the present disclosure describes a security method between the terminal and the network with FIG. 1 through FIG. 5.

FIG. 1 illustrates an example of a network environment for a security procedure in a wireless communication system according to various embodiments of the present disclosure. In FIG. 1, to explain the security procedure, a 5G network environment for the security procedure which protects terminal information is described.

Referring to FIG. 1, a network environment 100 configures, assuming the 5G network, a network system including a user plane function (UPF) 131, an SMF 121, AMFs 111 and 113, a 5G radio access network (RAN) 103, a user data management (UDM) 151, a policy control function (PCF) 161, and so on. Meanwhile, according to various embodiments, the network environment 100 may include an authentication server function (AUSF) 141 and an authentication, authorization and accounting (AAA) 171 to authenticate the network entities of the network environment 100.

The terminal 101 may access the network over the 5G RAN 103. The AM 111 or the AMF 113 manages access or mobility of the terminal 101, and the SMF 113 manages a session for the terminal 101. The UPF 131 may be a gateway which routes traffic of the terminal 101. The AUSF 141 may store data for the authentication of the terminal 101. The UDM 151 may store user's subscription data, policy data, and so on. The PCF 161 may provide a function for determining policies of mobility management, session management, and so on. The AAA 171 may perform subscriber authentication which accesses a user of the terminal 101, authorization on an authorization level, or accounting. In the network environment 100, the network entities after the 5G RAN 103 may be referred to as a core network (CN) or a 5G CN.

The terminal 101 is a device used by the user, and may be referred to as a user equipment (UE). Also, in some cases, the UE 101 may be operated without user's involvement. That is, the UE 101 is a device which performs machine type communication (MTC) and may not be carried by the user. The UE 101 may be referred to as, besides the UE, a terminal, a mobile station, a subscriber station, a remote terminal, a customer premises equipment (CPE), an electronic device, a wireless terminal, a user device, or a consumer device, or other term having a technically equivalent meaning.

While the present disclosure is described with the 5G network as an example, various embodiments of the present disclosure may be applied to a network relating to other communication system within the range understood by a person of ordinary skill in the pertinent art.

FIG. 2 illustrates an example of signal exchange for supporting security in a wireless communication system according to various embodiments of the present disclosure. FIG. 2 illustrates the example for supporting the security in transmitting UE information and data in the 5G network. Herein, a UE represents the UE 101 of FIG. 1, an AMF represents the AMF 101 or the AMF 103 of FIG. 1, and an SMF represents the SMF 121 of FIG. 1.

Referring to FIG. 2, the UE may transmit a registration request message to the AMF in operation 201. The UE transmits the registration request message to the network. The UE 101 may request the registration from the network.

The registration request message may include primary information and secondary information. Herein, a field, that is, information elements (IEs) corresponding to the primary information is transmitted as plain information. With regard to security information of the UE or mobility information of the UE, if the UE is previously registered in the AMF and the AMF has security related information, mobility related information, or policy related information of the UE, the UE may find a corresponding AMF when transmitting the registration request message to the AMF. In so doing, for an access network (AN) (e.g., the 5G-RAN 103) to transmit a corresponding message to an adequate AMF or for the AMF receiving the registration request message from the UE (it can be referred as a default AMF) to forward the registration request message to a corresponding adequate AMF, the AN or the AMF may use the primary information. Hence, information included in the primary information, which is contained by the UE in the registration request message and is used for the AN or the AMF to find the adequate AMF, should be transmitted as plain text.

Herein, the target AMF, that is, the adequate AMF may indicate an AMF which has or is to have the security related information, the mobility related information, or the policy related information of the UE. According to an embodiment, the AMF receiving the registration request message may be different from the adequate AMF. According to another embodiment, if the AMF receiving the registration request message is the same as a previous AMF which has the security related information, the mobility related information, or the policy related information, the AMF receiving the registration request message may be the adequate AMF.

According to various embodiments, if the UE previously registers and the AMF services the UE in relation to the security information or the mobility information of the UE, the UE uses this information to find the AMF having corresponding information. Information, IEs contained in the primary information may include at least one of Key Set Identifier for Next Generation Radio Access Network (ngKSI), $5^{th}$ generation system (5GS) mobile identity, UE security capability, requested Network Slice Selection Assistance Information (NSSAI), last visited registered Tracing Area Identity (TAI), additional Globally Unique Temporary Identifier (GUTI), old GUTI, mobile identity type, NASSAI info for packet data unit (PDU) sessions, or Evolved Packet System (EPS) Non Access Stratum (NAS) message container.

The registration request message may include the secondary information. The secondary information can be sent with a confidentially protection. If the message transmitted from the UE is forwarded to the adequate AMF because a first AMF is not the adequate AMF, the registration request message may include the secondary information. If the AMF has no security context, the registration request message may include the secondary information. If the registration request message fails, at the AMF, the integrity check to verify integrity protection of the registration request message transmitted from the UE to the AMF (e.g. 3GPP TS 24.501 REGISTERATINN REQEST), the registration request message may include the secondary information. If it is necessary to find the adequate AMF, the registration request message may include the secondary information. If the AMF needs to generate security context, security key, and so on with a new UE, the registration request message may include the secondary information. Information for protecting the information of the UE and information for discovering the AMF or not required to discover the AMF among the mobility context, the security context, and the policy context are protected and transmitted as the secondary information. Thus, such secondary information is ciphered and transmitted. An embodiment of such secondary information is information such as 5G system mobility management (5GMM) capability, S1 UE network capability, Uplink data status, PDU session Status, mobile initiated connection only (MICO) indication, UE status, SMS requested, allowed PDU session status, policy section identifier list, UE's usage setting, and so on, which are other information (IE) than the information (IE) included in the primary information of the IEs included in the registration request message, that is, the secondary information may be transmitted as ciphered information according to an embodiment.

According to an embodiment, a nonce UE may be transmitted as the primary information, that is, the plain information. Also, according to an embodiment, the nonce UE may be transmitted as the ciphered secondary information.

Meanwhile, the registration request message transmitted from the UE to the AMF may be integrity protected or ciphered if there is the security context between the UE and the network. In addition, the registration request message transmitted from the UE to the AMF may be integrity protected or encrypted using a null algorithm (null ciphering algorithm) if there is the security context between the UE and the network.

Also, as an embodiment, the registration request message transmitted from the UE to the AMF may be merely integrity protected and transmitted if there is the security context between the UE and the network. The secondary information may be the protected information.

If the UE transmits the registration request message, the UE may perform the registration by discovering a corresponding AMF through the primary information.

In example, the registration request message may be the REGISTRATION REQUEST message defined in 3GPP TS 24.501.

In operation 203, the AMF may transmit a security mode command message to the UE. According to various embodiments, the AMF may transmit to the UE an indication indicating that the secondary information is required, that is, an indication requesting the secondary information. The UE may transmit the indication by including the indication in the security mode command. The security mode command message includes the indication. According to various embodiments, if the message transmitted to the AMF from the UE fails the verification of the integrity protection at the AMF, the AMF may transmit the indication. In addition, according to various embodiments, if the AMF has no security context (i.e., the AMF is unable to find the security context), the AMF may transmit the indication. Further, according to various embodiments, if the message transmitted to the AMF may not decrypted or failed in decryption (in other words, the AMF cannot decrypt the message), the AMF may transmit the indication. According to various embodiments, the AMF may transmit, to the UE, an indication indicating that additional information is required, to transmit the indication indicating that the secondary information is required.

In example, the security mode command message may be the SECURITY MODE COMMAND message defined in 3GPP TS 24.501.

In operation 205, the UE may transmit a security mode complete message to the AMF. The UE may transmit the security mode complete message to the AMF in response to receiving the security mode command message. The UE may transmit the security mode complete message according to the indication. In some embodiments, by using the security mode complete message, the UE may retransmit the above-stated secondary information. In some embodiments, by using the security mode complete message, the UE may retransmit the registration request message. The descriptions of the registration request message in operation 203 may be similarly applied to the registration request message retransmitted in operation step 205. In example, the security mode complete message may be the SECURITY MODE COMPLETE message defined in 3GPP TS 24.501.

In operation 207, the AMF may transmit a registration accept message to the UE. As a response of the registration request for the UE, the AMF may transmit the registration accept message. In example, the registration accept message may be the REGISTRATION ACCEPT message defined in 3GPP TS 24.501. In some embodiment, unlike the operation shown in the FIG. 2, the AMF may transmit a registration reject message as the response of the registration request message. In example, the registration reject message may be the REGISTRATION REJECT message defined in 3GPP TS 24.501.

FIG. 3 illustrates another example of signal exchange for supporting security in a wireless communication system according to various embodiments of the present disclosure. In FIG. 3, the example for supporting the security in transmitting UE information and data in a 5G network is described. Herein, the UE represents the UE 101 of FIG. 1, an AMF represents the AMF 101 or the AMF 103 of FIG. 1, and an SMF represents the SMF 121 of FIG. 1.

Referring to FIG. 3, the UE may transmit a service request message to the AMF in operation 301. The UE may request a service. In example, the service request message may be the SERVICE REQUEST message defined in 3GPP TS 24.501.

The service request message may include primary information and secondary information. Herein, a field, that is, IEs corresponding to the primary information are transmitted as plain information. With regard to security information of the UE or mobility information of the UE, if the UE is previously registered in the AMF and the AMF has security related information, mobility related information, or policy related information of the UE, the UE may discover a corresponding AMF when transmitting the service request message to the AMF. In so doing, if an AN (e.g., the 5G-RAN 103) transmits a corresponding message to an adequate AMF or if the AMF receiving the service request message from the UE, for example, a default AMF forwards the service request message to a corresponding adequate AMF, the AN or the AMF may use the primary information. Hence, information included by the UE in the service request message and included in the primary information to be used for the AN or the AMF to find the adequate AMF, should be transmitted as plain text. Thus, the information included in the primary information, which is contained by the UE in the service request message and is used for the AN or the AMF to find the adequate AMF, should be transmitted as the plain text.

Herein, the target AMF, that is, the adequate AMF may indicate an AMF which has or is to have the security related information, the mobility related information, or the policy related information of the UE. According to an embodiment, the AMF receiving the service request message may be different from the adequate AMF. According to another embodiment, if the AMF receiving the service request message is the same as a previous AMF having the security related information, the mobility related information, or the policy related information, the default AMF may be the adequate AMF.

According to various embodiments, if the UE previously registers and the AMF services the UE in relation to the security information or the mobility information of the UE, the UE uses this information to find the AMF having corresponding information. Accordingly, such information should be transmitted as plain text. Information, that is, IEs contained in the primary information may include, as an embodiment, at least one of ngKSI or 5GS mobile identity.

The service request message may include the secondary information. The secondary information can be sent with a confidentially protection. If the message transmitted from the UE is forwarded to the adequate AMF because a first AMF is not the adequate AMF, the service request message may include the secondary information. If the AMF has no security context (i.e., the AMF is unable to find the security context), the service request message may include the secondary information. If the service request message fails, at the AMF, the integrity check to verify integrity protection of the service request message transmitted from the UE to the AMF (e.g. 3GPP TS 24.501 SERVICE REQEST), the service request message may include the secondary information. If it is necessary to find the adequate AMF, the service request message may include the secondary information. If the AMF needs to generate security context, security key, and so on with a new UE, the service request message may include the secondary information. Information for protecting the information of the UE and information for discovering the AMF or not required to discover the AMF among the mobility context, the security context, and the policy context are protected and transmitted as the secondary information. Thus, such secondary information is ciphered and transmitted.

An embodiment of such secondary information is information such as Uplink data status, PDU session Status, allowed PDU session status, and so on, which are other information than the information (IEs) contained in the primary information among the IEs included in the service request message, that is, the secondary information may be transmitted as the ciphered information.

Meanwhile, the service request message transmitted from the UE to the AMF may be integrity protected or ciphered if there is the security context between the UE and the network.

Meanwhile, the service request message transmitted from the UE to the AMF may be integrity protected or ciphered using a null algorithm if there is the security context between the UE and the network.

Meanwhile, the service request message transmitted from the UE to the AMF may be integrity protected using only the integrity protection if there is the security context between the UE and the network. The secondary information may be the protected information.

If the UE transmits the corresponding service request message, the UE may perform the service by discovering a corresponding AMF through the primary information. In example, the service request message may be the SERVICE REQUEST message defined in 3GPP TS 24.501.

In operation 303, the AMF may transmit a security mode command message to the UE. According to various embodiments, the AMF may transmit to the UE an indication indicating that the secondary information is required, that is, the indication requesting the secondary information. The UE may transmit the indication by including the indication in the security mode command. The security mode command message includes the indication.

According to various embodiments, if the message transmitted to the AMF fails the verification of the integrity protection at the AMF, the AMF may transmit the indication. In addition, according to various embodiments, if the AMF has no security context, the AMF may transmit the indication. Further, according to various embodiments, if the AMF may not conduct decryption or fail in the decryption (in other words, if the AMF cannot decrypt the message, the AMF may transmit the indication. That is, the AMF may transmit, to the UE, the indication indicating that additional information is required, that is, the indication indicating that the secondary information is required. In example, the security mode command message may be the SECURITY MODE COMMAND message defined in 3GPP TS 24.501.

In operation 305, the UE may transmit a security mode complete message to the AMF. The UE may transmit the security mode complete message to the AMF in response to receiving the security mode command message. The UE may transmit the security mode complete message according to the indication. In some embodiments, by using the security mode complete message, the UE may retransmit the above-stated secondary information. In some embodiments, by using the security mode complete message, the UE may retransmit the service request message. The descriptions of the service request message in operation 303 may be similarly applied to the service request message retransmitted in operation step 305. In example, the security mode complete message may be the SECURITY MODE COMPLETE message defined in 3GPP TS 24.501.

In operation 307, the AMF may transmit a service accept message. As a response of the service request for the UE, the AMF may transmit the service accept message. In example, the service accept message may be the SERVICE ACCEPT message defined in 3GPP TS 24.501. In some embodiment, unlike the operation shown in the FIG. 3, the AMF may transmit a service reject message as the response of the service request message. In example, the service reject message may be the SERVICE REJECT message defined in 3GPP TS 24.501.

According to various embodiments of the present disclosure, the security mode command message may be defined variously. As an example of an embodiment, the security mode command message may be configured as shown in Table 1.

TABLE 1

| IEI | Information Element | Type/Reference | Presence | Format | Length |
|---|---|---|---|---|---|
| | Extended protocol discriminator | Extended protocol discriminator | M | V | 1 |
| | Security header type | Security header type | M | V | ½ |
| | Spare half octet | Spare half octet | M | V | ½ |
| | Security mode command message identity | Message type | M | V | 1 |
| | Selected NAS security algorithms | NAS security algorithms | M | V | 1 |
| | NAS key set identifier | NAS key set identifier | M | V | 1 |
| | Replayed UE security capabilities | UE security capability | M | LV | 3-5 |
| E- | IMEISV request | IMEISV request | O | TV | 1 |
| 55 | Replayed nonce$_{UE}$ | Nonce | O | TV | 5 |
| 56 | Nonce$_{AMF}$ | Nonce | O | TV | 5 |
| 4F | Hash$_{AMF}$ | Hash$_{AMF}$ | O | TV | 9 |
| 78 | EAP message | EAP message | O | TLV-E | 7 |
| C | Secondary information indi | | O | TV | 1 |
| | Security policy container | | O | TLV | |

Such a security mode command message may include security policy related information as well, and such security policy related information may be transmitted as a TLV to notify the security policy information to the UE. Meanwhile, the security mode command message is integrity protected and transmitted.

Meanwhile, as an embodiment, the UE moves in 4G or 5G, that is, interworks between 4G and 5G, that is, moves between two networks in various manners. The 5G AMF may have UE related information, that is, mobility information, security context, and so on because (case 1) the UE has been registered in the 4G and moves to the 5G in an embodiment, or (case 2) the UE has been registered in the 5G before and comes back from the 4G to the 5G, that is, the UE has been registered in the 5G in an embodiment. Hence, an information element which is a mobility identify type may be used to distinguish an old identifier from a UE identifier according to which network the UE have accessed. That is, the mobility identify type IE notifies the type of the old identifier of the UE (e.g., to the network). The mobility identify type IE of the registration request message is used to distinguish whether 5GS mobility identity corresponds to a mapped globally unique temporary identifier (GUTI) notifying GUTI mapped from the 4G, or a native GUTI generated by accessing the 5G. As an embodiment, the mobility identity type IE may be included in the message as shown in Table 2 or Table 3.

TABLE 2

| IEI | Information Element | Type/Reference | Presence | Format | Length |
|---|---|---|---|---|---|
|  | Extended protocol discriminator | Extended Protocol discriminator | M | V | 1 |
|  | Security header type | Security header type | M | V | ½ |
|  | Spare half octet | Spare half octet | M | V | ½ |
|  | Registration request message identity | Message type | M | V | 1 |
|  | 5GS registration type | 5GS registration type | M | V | 1 |
|  | ngKSI | NAS key set identifier | M | V | 1 |
|  | 5GS mobile identity | 5GS mobile identity | M | LV | 5-12 |
| 55 | Nonce$_{UE}$ | Nonce | O | TV | 5 |
| 10 | 5GMM capability | 5GMM capability | O | TLV | 4-15 |
| 2E | UE security capability | UE security capability | O | TLV | 4-6 |
| 2F | Requested NSSAI | NSSAI | O | TLV | 4-74 |
| 52 | Last visited registered TAI | Tracking area identity | O | TV | 6 |
| 30 | S1 UE network capability | S1 UE network capability | O | TV | 6-13 |
| 40 | Uplink data status | Uplink data status | O | TLV | 4 |
| 50 | PDU session status | PDU session status | O | TLV | 4 |
| B- | MICO indication | MICO indication | O | TV | 1 |
| 2B | UE status | UE status | O | TLV | 3 |
| 2C | Additional GUTI | 5GS mobile identity | O | TLV | TBD |
| 2D | NSSAI info for PDU sessions | NSSAI info for PDU sessions | O | TLV | 5-112 |
| C- | SMS requested | SMS requested | O | TV | 1 |
| 7C | EPS NAS message container | EPS NAS message container | O | TLV-E | TBD |
| 25 | Allowed PDU session status | Allowed PDU session status | O | TLV | 4-34 |
| TBD | Policy section identifier list | Policy section identifier list | O | TBD | TBD |
| 60 | UE's usage setting | UE's usage setting | O | TLV | 3 |
|  | Mobile identity type | Mobile identity type | O |  |  |

TABLE 3

| IEI | Information Element | Type/Reference | Presence | Format | Length |
|---|---|---|---|---|---|
|  | Extended protocol discriminator | Extended Protocol discriminator | M | V | 1 |
|  | Security header type | Security header type | M | V | ½ |
|  | Spare half octet | Spare half octet | M | V | ½ |
|  | Registration request message identity | Message type | M | V | 1 |
|  | 5GS registration type | 5GS registration type | M | V | 1 |
|  | ngKSI | NAS key set identifier | M | V | 1 |
|  | 5GS mobile identity | 5GS mobile identity | M | LV | 5-12 |
|  | Mobile identity type | Mobile identity type | M |  |  |
| 55 | Nonce$_{UE}$ | Nonce | O | TV | 5 |
| 10 | 5GMM capability | 5GMM capability | O | TLV | 4-15 |
| 2E | UE security capability | UE security capability | O | TLV | 4-6 |
| 2F | Requested NSSAI | NSSAI | O | TLV | 4-74 |
| 52 | Last visited registered TAI | Tracking area identity | O | TV | 6 |
| 30 | S1 UE network capability | S1 UE network capability | O | TV | 6-13 |
| 40 | Uplink data status | Uplink data status | O | TLV | 4 |
| 50 | PDU session status | PDU session status | O | TLV | 4 |
| B- | MICO indication | MICO indication | O | TV | 1 |
| 2B | UE status | UE status | O | TLV | 3 |
| 2C | Additional GUTI | 5GS mobile identity | O | TLV | TBD |
| 2D | NSSAI info for PDU sessions | NSSAI info for PDU sessions | O | TLV | 5-112 |
| C- | SMS requested | SMS requested | O | TV | 1 |
| 7C | EPS NAS message container | EPS NAS message container | O | TLV-E | TBD |
| 25 | Allowed PDU session status | Allowed PDU session status | O | TLV | 4-34 |

TABLE 3-continued

| IEI | Information Element | Type/Reference | Presence | Format | Length |
|---|---|---|---|---|---|
| TBD | Policy section identifier list | Policy section identifier list | O | TBD | TBD |
| 60 | UE's usage setting | UE's usage setting | O | TLV | 3 |

A configuration of the mobility identity type may be configured as shown in Table 4, 5, 6, and 7.

TABLE 4

| 8 | 7 | 6 | 5 | 4 | 3 | 2 | 1 | |
|---|---|---|---|---|---|---|---|---|
| Mobile identity type IEI | | | | 0 spare | Mobile identity type value | | | octet 1 |

TABLE 5

Mobile identity type value (octet 1)
Bits

| 3 | 2 | 1 | |
|---|---|---|---|
| 0 | 0 | 0 | Native GUTI |
| 0 | 0 | 1 | Mapped GUTI |

TABLE 6

| 8 | 7 | 6 | 5 | 4 | 3 | 2 | 1 | |
|---|---|---|---|---|---|---|---|---|
| Mobile identity type IEI | | | | 0 0 0 spare | Mobile identity type value | | | octet 1 |

TABLE 7

Mobile identity type value (octet 1)
Bits

| 1 | |
|---|---|
| 0 | Native GUTI |
| 1 | Mapped GUTI |

According to various embodiments, a secondary info indication may be configured in various manners. The indication may be referred as a secondary info indication. As an embodiment, the secondary info indication may be configured as shown in Table 8 or Table 9.

The secondary info indication may be configured as a type 1 information element.

TABLE 8

| 8 | 7 | 6 | 5 | 4 | 3 | 2 | 1 | |
|---|---|---|---|---|---|---|---|---|
| Secondary info indication IEI | | | | 0 spare | Secondary info indication value | | | octet 1 |

TABLE 9

Secondary info indication value (octet 1)
Bits

| 3 | 2 | 1 | |
|---|---|---|---|
| 0 | 0 | 0 | Secondary information not requested |
| 0 | 0 | 1 | Secondary information requested |

All other values are interpreted as secondary information not requested by this version of the protocol.

According to an embodiment, since the transmission of the secondary info indication requires more information, a more information indication may be used.

The more information indication may be configured as the type 1 information element. For example, the more information indication may be configured as shown in Table 10 or Table 11.

TABLE 10

| 8 | 7 | 6 | 5 | 4 | 3 | 2 | 1 | |
|---|---|---|---|---|---|---|---|---|
| more info indication IEI | | | | 0 spare | more info indication value | | | octet 1 |

TABLE 11

More info indication value (octet 1)
Bits

| 3 | 2 | 1 | |
|---|---|---|---|
| 0 | 0 | 0 | More information not requested |
| 0 | 0 | 1 | More information requested |

All other values are interpreted as more information not requested by this version of the protocol.

As an embodiment, in implementing the more information indication, the more information indication required may be notified using an information element such as IMEISV request to save bits. That is, the more information indication may be configured as shown in Table 12 or Table 13.

TABLE 12

| 8 | 7 | 6 | 5 | 4 | 3 | 2 | 1 | |
|---|---|---|---|---|---|---|---|---|
| more info indication IEI | | | | 0 spare | more info indication value | | | octet 1 |

TABLE 13

More info indication value (octet 1)
Bits

| 3 | 2 | 1 | |
|---|---|---|---|
| 0 | 0 | 0 | IMEISV not requested |
| 0 | 0 | 1 | IMEISV requested |
| 0 | 1 | 0 | More information not requested |
| 0 | 1 | 1 | More information requested |

All other values are interpreted as more information not requested by this version of the protocol.

Meanwhile, the more information indication may be configured as shown in Table 14 instead of Table 13.

TABLE 14

More info indication value (octet 1)
Bits

| 3 | 2 | 1 | |
|---|---|---|---|
| 0 | 0 | 0 | IMEISV not requested |
| 0 | 0 | 1 | IMEISV requested |
| 0 | 0 | 0 | More information not requested |
| 0 | 1 | 0 | More information requested |

All other values are interpreted as more information not requested by this version of the protocol.

As an embodiment, the secondary info indication may be configured as shown in Table 15 or Table 16. The secondary info indication may be configured as the type 1 information element.

TABLE 15

| 8 | 7 | 6 | 5 | 4 | 3 | 2 | 1 | |
|---|---|---|---|---|---|---|---|---|
| Secondary info indication IEI | | | | 0 0 0 spare | | | Secondary info indication value | octet 1 |

TABLE 16

Secondary info indication value (octet 1)
Bits
1

| 0 | Secondary information not requested |
|---|---|
| 1 | Secondary information requested |

All other values are interpreted as secondary information not requested by this version of the protocol.

FIG. 4 illustrates a configuration of a network entity in a wireless communication system according to various embodiments of the present disclosure. The configuration of FIG. 4 may be construed as the configuration of the AMF 111 or the AMF 113. A term such as 'portion' or '~er' used in the following indicates a unit for processing at least one function or operation, and may be implemented using hardware, software, or a combination of hardware and software.

Referring to FIG. 4, the network entity includes a communication unit 410, a storage unit 420, and a control unit 430.

The communication unit 410 may perform functions for transmitting or receiving information. Specifically, the communication unit 410 may provide an interface for communicating with other network entities, wireless nodes in the network. That is, the communication unit 410 converts a bit string transmitted from an operating device to other node, for example, a server, a sensor device, an upper network node, and so on, to a physical signal, and converts a physical signal received from a base station to a bit string.

The communication unit 410 may perform functions for transmitting or receiving signals in a wired communication environment. The communication unit 410 may include a wired interface for controlling a direct connection between a device and a device through a transmission medium (e.g., a copper wire, optical fiber). For example, the communication unit 410 may forward an electrical signal to other device through copper wire, or perform a conversion between an electrical signal and an optical signal.

The communication unit 410 may perform functions for transmitting and receiving signals in a wireless communication environment. For example, the communication unit 410 may perform conversion functions between a baseband signal and a bit string according to a physical layer standard of a system. Also, the communication unit 410 may include a plurality of transmit and receive paths.

As such, the communication unit 410 transmits and receives the signals. Hence, whole or part of the communication unit 410 may be referred to as a transmitter, a receiver, or a transceiver. Further, in the following explanations, the transmission and the reception over a radio channel is used to embrace the above-stated processing of the communication unit 410.

The storage unit 420 stores a basic program for operating the network entity, an application program, and data such as setting information. The storage unit 420 may be configured with a volatile memory, a non-volatile memory, or a combination of a volatile memory and a non-volatile memory. The storage unit 420 provides the stored data in response to a request of the control unit 430.

The control unit 430 controls general operations of the network entity. For example, the control unit 430 transmits and receives signals through the communication unit 410. Also, the control unit 430 records and reads data in and from the storage unit 420. The control unit 430 may execute functions of a protocol stack requested by a communication standard. According to other implementation, the protocol stack may be included in the communication unit 410. For doing so, the control unit 430 may include at least one processor.

According to various embodiments, the control unit 430 may control the network entity to carry out operations to be explained according to various embodiments of the present disclosure. For example, the control unit 430 may control the communication unit to receive the registration request message or the security mode complete message at the network entity, or control the communication unit to transmit the security mode command message or the registration accept message.

FIG. 5 illustrates a configuration of a UE in a wireless communication system according to various embodiments of the present disclosure. The configuration of FIG. 5 may be construed as the configuration of the UE 101. A term such as 'portion' or '~er' used in the following indicates a unit for processing at least one function or operation, and may be implemented using hardware, software, or a combination of hardware and software.

Referring to FIG. 5, the UE includes a communication unit 510, a storage unit 520, and a control unit 530.

The communication unit 510 may perform functions for transmitting and receiving signals over a radio channel. For example, the communication unit 510 performs a conversion function between a baseband signal and a bit string according to a physical layer standard of a system. For example, in data transmission, the communication unit 510 generates complex symbols by encoding and modulating a transmit bit string. Also, in data reception, the communication unit 510 restores a receive bit string by demodulating and decoding a baseband signal. Also, the communication unit 510 upconverts the baseband signal to a radio frequency (RF) band signal, transmits it via an antenna, and down-converts an RF band signal received via the antenna to a baseband signal. For example, the communication unit 510 may include a transmit filter, a receive filter, an amplifier, a mixer, an oscillator, a digital to analog converter (DAC), an analog to digital converter (ADC), and the like.

Also, the communication unit 510 may include a plurality of transmit and receive paths. Further, the communication unit 510 may include at least one antenna array including a plurality of antenna elements. In view of hardware, the communication unit 510 may include a digital circuit and an analog circuit (e.g., an RF integrated circuit (RFIC)). Herein, the digital circuit and the analog circuit may be implemented as a single package. Also, the communication unit 510 may include a plurality of RF chains. Further, the communication unit 510 may perform beamforming.

In addition, the communication unit 510 may include different communication modules for processing signals of different frequency bands. Further, the communication unit 510 may include a plurality of communication modules for supporting different radio access technologies. For example, different radio access technologies may include Bluetooth low energy (BLE), wireless fidelity (Wi-Fi), WiFi Gigabyte (WiGig), and a cellular network (e.g., Long Term Evolution (LTE)). Also, different frequency bands may include a super high frequency (SHF) (e.g., 2.5 GHz, 5 GHz) band and a millimeter weave (e.g., 60 GHz) band.

As such, the communication unit 510 transmits and receives the signals. Hence, whole or part of the communication unit 510 may be referred to as a transmitter, a receiver, or a transceiver. Hereafter, the transmission and the reception over the radio channel include the above-stated processing of the communication unit 510.

The storage unit 520 stores a basic program for operating the UE, an application program, and data such as setting information. The storage unit 520 may be configured with a volatile memory, a non-volatile memory, or a combination of a volatile memory and a non-volatile memory. The storage unit 520 provides the stored data according to a request of the control unit 530.

The control unit 530 controls general operations of the UE. For example, the control unit 530 transmits and receives signals through the communication unit 510. Also, the control unit 530 records and reads data in and from the storage unit 520. The control unit 530 may execute functions of a protocol stack required by a communication standard. For doing so, the control unit 530 may include at least one processor or microprocessor, or may be part of a processor. Also, part of the communication unit 510 and the control unit 530 may be referred to as a communication processor (CP). According to various embodiments, the control unit 530 may control the UE to carry out operations according to various embodiments of the present disclosure. For example, the control unit 530 may control the communication unit to transmit the registration request message or the security mode complete message from the UE, or control the communication unit to receive the security mode command message or the registration accept message.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

The invention claimed is:

1. A method performed by a user equipment (UE) in a wireless communication, the method comprising:
    transmitting, to an access and mobility management function (AMF), a first message for a request;
    receiving, from the AMF, a security mode command message including indication information for requesting a retransmission of the request, wherein the indication information includes a bit for indicating whether the retransmission is requested or not;
    transmitting, to the AMF, a second message for the request by using a security mode complete message in response to the security mode command message, in case that the bit is set to a value indicating that the retransmission is requested; and receiving, from the AMF, a response message for the request,
wherein the request includes a registration request or a service request,
wherein the value of the bit indicates that the retransmission is requested in case that the AMF is unable to decrypt a ciphered message for the request, and
wherein the security mode complete message is ciphered and integrity protected.

2. The method of claim 1,
wherein the request includes the registration request,
wherein the first message comprises includes plain information and protected information associated with a security context,
wherein the plain information includes at least one of:
key set identifier for next generation radio access network (ngSKI),
$5^{th}$ generation system (5GS) mobile identity,
UE security capability,
additional globally unique temporary identifier (GUTI), or
evolved packet system (EPS) non access stratum (NAS) message container, and
wherein the protected information includes at least one of:
5GS mobility management (5GMM) capability,
S1 information element (IE) network capability,
Uplink data status,
protocol data unit (PDU) session status,
Mobile Initiated Connection Only (MICO) indication,
allowed PDU session status, or
UE's usage setting.

3. The method of claim 1,
wherein the request includes the service request,
wherein the first message includes plain information and protected information associated with a security context,
wherein the plain information includes key set identifier for next generation radio access network (ngSKI); and
wherein the protected information includes at least one of:
Uplink data status,
protocol data unit (PDU) session status, or
allowed PDU session status.

4. A method performed by an access and mobility management function (AMF) in a wireless communication, the method comprising:
receiving, from a user equipment (UE), a first message for a request;
transmitting, to the UE, a security mode command message including indication information for requesting a retransmission of the request, wherein the indication information includes a bit for indicating whether the retransmission is requested or not;
receiving, from the UE, a second message for the request using a security mode complete message in response to the security mode command message, in case that the bit being set to a value indicating that the retransmission is requested; and
transmitting, to the UE, a response message for the request,
wherein the request includes a registration request or a service request,
wherein the value of the bit indicates that the retransmission is requested in case that the AMF is unable to decrypt a ciphered message for the request, and
wherein the security mode complete message is ciphered and integrity protected.

5. The method of claim 4,
wherein the request includes the registration request,
wherein the first message comprises includes plain information and protected information associated with a security context,
wherein the plain information includes at least one of:
key set identifier for next generation radio access network (ngSKI),
$5^{th}$ generation system (5GS) mobile identity,
UE security capability,
additional globally unique temporary identifier (GUTI), or
evolved packet system (EPS) non access stratum (NAS) message container, and
wherein the protected information includes at least one of:
5GS mobility management (5GMM) capability,
S1 information element (IE) network capability,
uplink data status,
protocol data unit (PDU) session status,
mobile initiated connection only (MICO) indication,
allowed PDU session status, or
UE's usage setting.

6. The method of claim 4,
wherein the request includes the service request,
wherein the first message includes plain information and protected information associated with a security context,
wherein the plain information includes key set identifier for next generation radio access network (ngSKI), and
wherein the protected information includes at least one of:
uplink data status,
protocol data unit (PDU) session status, or
allowed PDU session status.

7. A user equipment (UE) comprising:
at least one transceiver; and
at least one processor coupled to the at least one transceiver and configured to:
transmit, to an access and mobility management function (AMF), a first message for a request,
receive, from the AMF, a security mode command message including indication information for requesting a retransmission of the request, wherein the indication information includes a bit for indicating whether the retransmission is requested or not,
transmit, to the AMF, a second message for the request by using a security mode complete message in response to the security mode command message, in case that the bit is set to a value indicating that the retransmission is requested, and
receive, from the AMF, a response message for the request,
wherein the request includes a registration request or a service request,
wherein the value of the bit indicates that the retransmission is requested in case that the AMF is unable to decrypt a ciphered message for the request, and
wherein the security mode complete message is ciphered and integrity protected.

8. The UE of claim 7,
wherein the request includes the registration request,
wherein the first message comprises includes plain information and protected information associated with a security context,
wherein the plain information includes at least one of:
key set identifier for next generation radio access network (ngSKI), 5$^{th}$ generation system (5GS) mobile identity,
UE security capability,
additional globally unique temporary identifier (GUTI), or
evolved packet system (EPS) non access stratum (NAS) message container, and wherein the protected information includes at least one of:
5GS mobility management (5GMM) capability,
S1 information element (IE) network capability,
Uplink data status,
protocol data unit (PDU) session status,
mobile initiated connection only (MICO) indication,
allowed PDU session status, or
UE's usage setting.

9. The UE of claim 7,
wherein the request includes the service request,
wherein the first message includes plain information and protected information associated with a security context,
wherein the plain information includes key set identifier for next generation radio access network (ngSKI), and
wherein the protected information includes at least one of:
Uplink data status,
protocol data unit (PDU) session status, or
allowed PDU session status.

* * * * *